L. A. KRUPP.
APRON WHEEL.
APPLICATION FILED DEC. 12, 1913.

1,148,518.

Patented Aug. 3, 1915.
2 SHEETS—SHEET 1.

WITNESSES:
D. C. Walter
F. E. Aul.

INVENTOR.
Leo A. Krupp
by
Owen Owen & Crampton

L. A. KRUPP.
APRON WHEEL.
APPLICATION FILED DEC. 12, 1913.
1,148,518.
Patented Aug. 3, 1915.
2 SHEETS—SHEET 2.
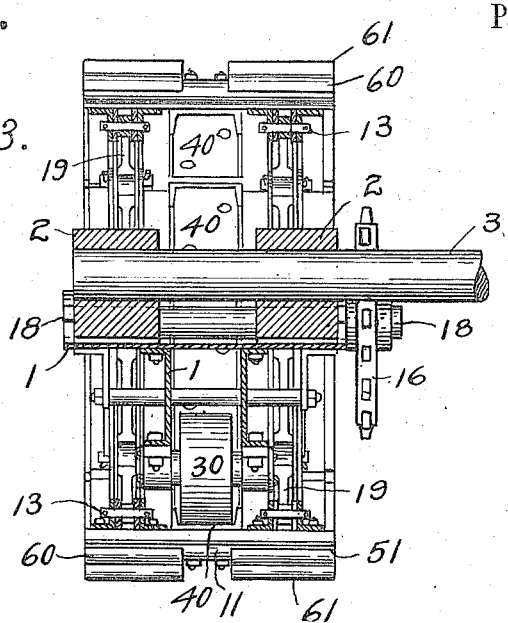
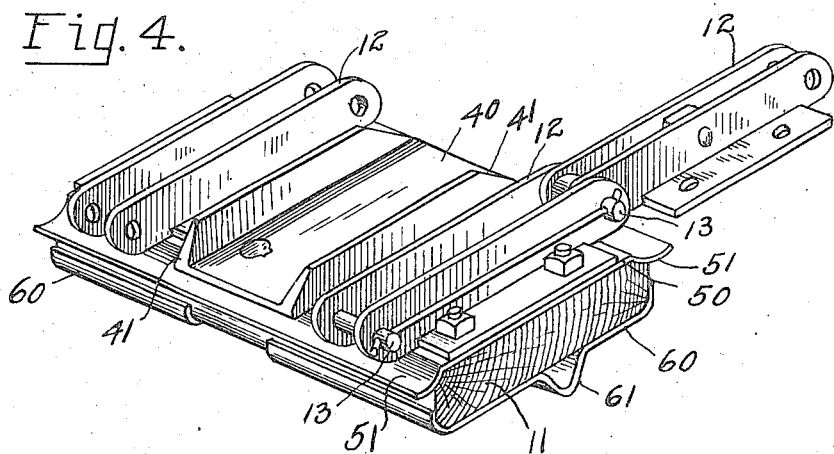
WITNESSES:
D. C. Walter
F. E. Aul.
INVENTOR.
Leo. A. Krupp,
by
Owen Owen & Crampton

UNITED STATES PATENT OFFICE.

LEO ALBERT KRUPP, OF FINDLAY, OHIO, ASSIGNOR TO THE BUCKEYE TRACTION DITCHER COMPANY, OF FINDLAY, OHIO, A CORPORATION OF OHIO.

APRON-WHEEL.

1,148,518.          Specification of Letters Patent.     Patented Aug. 3, 1915.

Application filed December 12, 1913. Serial No. 806,321.

*To all whom it may concern:*

Be it known that I, LEO A. KRUPP, a citizen of the United States, and a resident of Findlay, in the county of Hancock and State of Ohio, have invented a certain new and useful Apron-Wheel; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to apron wheels.

It has for its object to produce an apron wheel wherein the load is carried on a means having a broad supporting surface located on an apron.

In the devices now known in the art the weight of the conveyance, machine or other apparatus, is supported on the driving links.

My invention consists in providing in a traction apron, tracks or bearing parts for supporting the superstructure and links that may be used for driving the structure and operating the aprons.

It also consists in providing broad closely positioned rollers which support the construction and driving mechanism.

It also consists in providing an apron wheel wherein the axis or hub of the wheel will lie close to the surface traveled over.

It also consists in providing an apron wheel wherein the rolling member of the wheel will lie close to the under surface of the traction members.

It also consists in providing in a traction apron, shoes having interfitting dirt shield strips for the protection of the mechanism.

The invention may be contained in many constructions all of which come within purview of my claims hereinafter appended. To show the practicability of constructions embodying my invention, I have selected one of such constructions as an example and shall describe it hereinafter. The construction selected is illustrated in the accompanying drawings.

Figure 1:
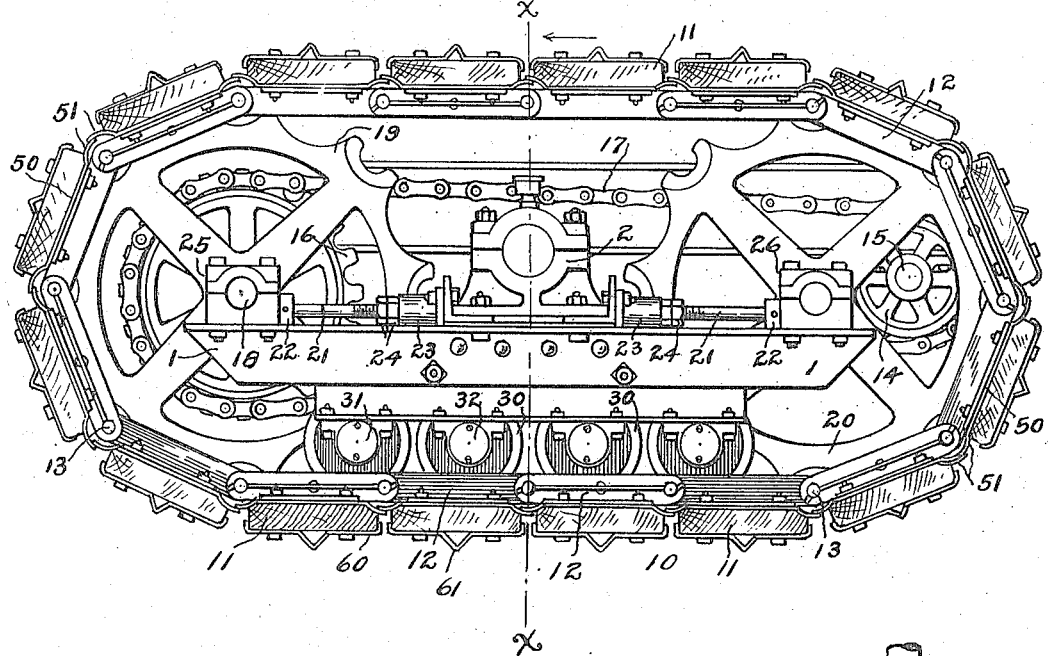
Figure 2:
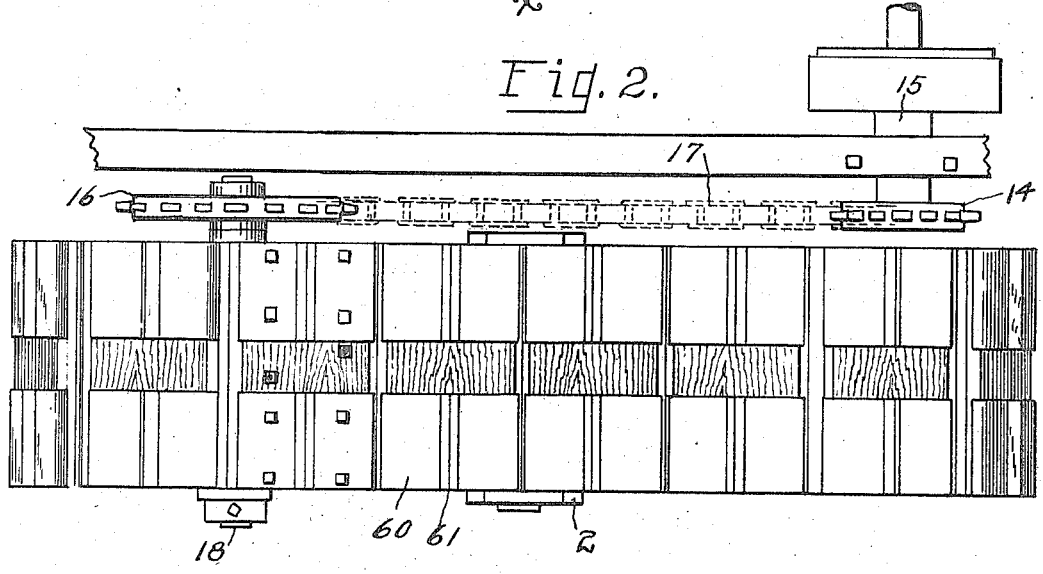

Figure 1 in the drawings is a side view of the traction apron. Fig. 2 is a top plan view of the apron. Fig. 3 is a cross sectional view of the same on line x—x. Fig. 4 illustrates an apron-shoe and its parts.

1, Fig. 1, is the supporting frame. It has centrally located journals or hub bearings 2 in which a shaft or axle 3, Fig. 3, may be located. The shaft 3 supports the superstructure of the machine.

The apron 10 is provided with a plurality of interconnecting traction members which may consist of short planks 11 which are bolted to links 12. The links 12 are connected together by means of pivot pins 13. The apron is driven by means of the sprocket wheel 14 located on the shaft 15 which may be connected to a power mechanism by means of a differential. The sprocket 14 is connected with the sprocket 16 by means of the chain 17. The sprocket 16 is mounted on the shaft 18 to which is keyed the apron sprockets 19 which coact with the links 12 to propel the apron. Sprocket wheels 20 also operate to support the apron and guide it in its beltlike movement over the sprockets 19 and 20. The sprockets 19 and 20 are journaled in the frame 1 and are braced by the bracing or spreading members 21 which extend between the journal boxes 2 and the journal boxes of the sprocket wheels 19 and 20 and operate to spread the sprockets of the apron 19 and 20 and thus adjust them with respect to any wear or looseness that may exist between connecting members of the aprons.

Each clamping member 21 has a threaded rod connected to a block 22 at one end. The other end is located in a block 23 movable lengthwise with respect to the rod. Nuts 24 located on the threaded end of the rod may be rotated which will bear against the block 23 and thus spread the journals 25 and 26.

A plurality of rollers 30 having comparatively broad surfaces are closely positioned beneath the frame 1. The rollers are keyed to their journals which rotate in covered journal boxes 31. The rollers move in channel track sections 40, Fig. 3, which are bolted to the shoes 11 between the links 12. The ends of the track section register with each other successively so that they form one continuous track on which the broad bearing rollers 30 roll. The ends of the track sections 40 are inclined or beveled as at 41 in order that as the shoes turn around the sprockets 19 and 20 the corners of the track sections may not bind or interfere with one another and so as to permit the track sections to go around the wheels 19 and 20.

The channel track does away with flanged rollers which are sometimes used and permits the close placement of the rollers, which also permits the provision of a large number of bearing rollers. Furthermore, channel irons used for the track sections have strong side flanges for guiding the wheels, while the flanges located on wheels are liable to fracture. The rollers are chilled-surfaced which form good supporting bearing surfaces for supporting the machine and superstructure. Driving links being provided independent to the bearing tracks relieves a large part of the strain which is otherwise brought to bear upon the links if they form the supporting track. The channel track sections being bolted to the planks to which also the links are secured, the pivot points of the links lie substantially in the same plane with the bottoms of the channel track sections and the traction members being flat, the rollers are brought close to the surface traveled over by the apron wheel. This prevents lateral wabbling or swinging of the structure. The apron is also provided with a dirt shield which consists of the intermeshing or overlapping plates 50 which close the spaces between the shoes 11. The plates 50 are provided with segmental cylindrical overlapping parts 51 which have their axes in the axis of the pivot pins which lock together associated links so that as the shoes are carried around the sprockets 19 and 20 they present a closed and continuous dirt shield which prevents the dirt from entering the interior of the apron to a large extent and from reaching the mechanism.

The shoes may be made of metal or of wood. If they are made of wood they may be provided with exterior sheet metal traction coverings or shoes 60 having one or more corrugations 61 which engage with the surface over which the engine or machine may be carried.

The constructions selected and described may be greatly varied in arrangement and connection of its parts and in the substitution of elements having equivalent functions without departing from the spirit of the invention.

What I claim as new and desire to secure by Letters Patent is as follows:

1. In a traction apron, the combination of a supporting frame having a hub bearing secured centrally and bearing rollers secured to the said frame, traction members having registering bearing channel irons in which the rollers move, driving links located on opposite sides of the said channel track sections and in the plane of the bottom of the channel track sections.

2. In a traction apron, the combination of a frame extending substantially the length of the apron and having two sprocket wheels at each end and a hub bearing in the center, bearing rollers located on the under side of the frame, a plurality of connected planks, shoes secured to the planks, each having a registering channel track section and driving links located on each side of the channel track section and in close proximity to the plane of the bottom of the channel track sections and operated upon by the sprockets.

3. In a traction apron, the combination of a frame, a plurality of interconnected flat traction members having registering channel track sections, interconnected driving links located on each side of the track sections, overlapping shield strips located on the inside of the said traction members for closing the spaces between the edges of the traction members, bearing rollers secured to the frame and movable in the channel track, the traction members having shoes secured thereto.

4. In a traction apron, the combination of a frame, a pair of driving sprockets located on each end of the frame, bearing rollers journaled in the frame, a plurality of planks, a pair of driving chains having driving links bolted to the planks for pivotally connecting the planks together and coacting with the sprockets for driving the apron, registering channel track sections bolted to the planks the bottoms of the channels located in substantially the same plane with the links and forming a bearing for the rollers, the planks having overlapping sheet metal strips bolted to the inside thereof for closing the spaces between the side edges of the planks and sheet metal traction engaging parts bolted on the outside thereof.

5. In a traction apron, the combination of a frame, a pair of driving sprockets located on each end of the frame, bearing rollers journaled in the frame, a plurality of planks, driving links for connecting the planks together and coacting with the sprockets for driving the apron, the planks having registering channel track sections having bearings located in substantially the same plane with the links forming a bearing for the rollers, and the said planks having sheet metal overlapping protective strips.

6. In a traction apron, the combination of a frame having two sprocket wheels carried at each end and an axle bearing located in the center of the frame, an axle supported in said bearing, bearing rollers located on the under side of the frame and bearings for pivotally securing the bearing rollers to the under side of the frame, a plurality of connected traction members, each having registering channel irons forming channel track sections for containing the bearing rollers and driving links located on each side of the channel track and operated upon by the sprockets.

7. In a traction apron, the combination of a frame extending substantially the length of the apron and having two sprocket wheels carried at each end and an axle bearing located in the center of the frame, an axle supported in said bearing, bearing rollers and bearing members for pivotally securing the rollers to the under side of the frame, a plurality of flat traction members, each having registering channel irons forming a continuous channel track and for containing the bearing rollers and connected driving links located on each side of the channel track section and secured to the traction members in substantially the plane of the bottom of the channel irons and operated upon by the sprockets and means for driving one of the sprockets.

8. In a traction apron, the combination of a frame and having two sprocket wheels at each end and an axle bearing in the center, means for driving the sprockets, bearing rollers pivotally secured to the under side of the frame, a plurality of traction members, shoes secured to the traction members, each member having registering channel track sections and driving links located on each side of the channel track section and secured to the traction members and substantially in the plane of the bottom of the channel track sections and operated upon by the sprockets.

9. In a traction apron, the combination of a frame, sprocket wheels supported at the ends of the frame and an axle bearing located in the center of the frame, an axle supported in said bearing, bearing rollers having axles, the said frame having bearing members located on the under side of the frame for pivotally securing the bearing rollers and for supporting the frame on the axles of the bearing rollers, a plurality of traction members having registering channel irons forming a continuous channel track for the bearing rollers, and driving links secured to the traction members and operated upon by the sprockets and means for driving the sprockets.

In testimony whereof, I have hereunto signed my name to this specification in the presence of two subscribing witnesses.

LEO ALBERT KRUPP.

Witnesses:
R. H. O'BRIEN,
GRACE SHANK.